Patented Oct. 17, 1939

2,176,506

UNITED STATES PATENT OFFICE 2,176,506

TREATMENT OF TEXTILE AND OTHER MATERIALS

James G. McNally and Joseph B. Dickey, Rochester, N. Y., assignors to Eastman Kodak Company, Rochester, N. Y., a corporation of New Jersey No Drawing. Application March 14, 1938, Serial No. 195,868

13 Claims. (Cl. 8—61)

This invention relates to improvements in the treatment of materials and more particularly to the treatment of textile materials made of or containing a cellulose acetate or other organic derivative of cellulose to render their colorations more fast.

In the coloration of materials, particularly textile materials, made of or containing an organic derivative of cellulose it is of course desirable that the colors produced should be as fast as possible to the various agencies to which they may be subjected. A large number of dyes are known which color organic derivatives of cellulose but considerable difficulty has been experienced with respect to what may be termed acid fading. This difficulty has been noted principally in connection with commercially dyed cellulose acetate fabrics and has caused considerable concern in the trade especially among those who find it necessary to store dyed cellulose acetate fabrics for any length of time. The present invention is directed primarily to providing a process for treating materials made of or containing an organic derivative of cellulose to render their colorations more fast to acid. However, while the treatment of the present invention primarily renders the coloration more resistant to acid, it has likewise been found that the fastness of the coloration to light is generally improved, although this latter improvement is ordinarily not nearly as marked as the former.

The expression "an organic derivative of cellulose", as used herein, and in the claims, includes the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose.

Among dyes suffering from a lack of fastness to acid and to the combined agencies of light and acid, but which otherwise are of great value for the coloration of organic derivatives of cellulose, are certain anthraquinone dyes, particularly those containing free amino or alkylamino groups. These aminoanthraquinone dyes are further characterized in that they contain no nuclear sulphonic or carboxylic acid group. Some of the amino-anthraquinone dyes above referred to yield in cellulose esters or ethers valuable blue shades difficult to secure by other means and it is, accordingly, of considerable importance that a satisfactory method of increasing the fastness of these dyes in particular should be found.

It is not to be assumed from the foregoing, however, that the anthraquinone dyes constitute the only class of dyes which yield colorations on materials made of or containing an organic derivative of cellulose which lack fastness to acid or to the combined agencies of light and acid. Naphthazarin, indophenol, and azo dyes suitable for the coloration of organic derivatives of cellulose similarly have been found to yield colorations in materials made of or containing an organic derivative of cellulose which are not fast to acid or to the combined agencies of acid and light. In general, as more fully noted hereinafter, we have found that dyes, and anthraquinone dyes in particular, containing an amino or mono-substituted amino group are not fast to acid and undergo a color change when exposed thereto.

In order that the color changes which take place in cellulose acetate fabrics, for example, dyed with various dyes containing an amino or substituted amino group, may be fully understood, it might be noted that cellulose acetate colored blue with 1,4-dimethylaminoanthraquinone when exposed to the combustion products of coal gas or nitrous acid fumes changes in a short time to a pinkish red. Similar color changes occur in cellulose acetate fabrics dyed with other aminoanthraquinone dyes such as 1,4-di-β-hydroxyethylaminoanthraquinone, 1-amino-4-β-hydroxyethylaminoanthraquinone, 1-hydroxy-4-methylaminoanthraquinone and 1,4-diaminoanthraquinone, for example. Again, in the case of 1 - methylamino - 4 - p-aminophenylaminoanthraquinone, the color changes from blue green to gray.

In further illustration of the color changes which take place, cellulose acetate cloth dyed with the azo dye having the formula:

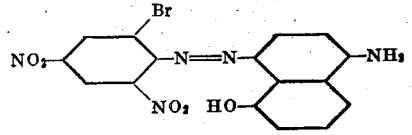

fades from blue to a pinkish red, while cellulose acetate fabrics dyed with the azo dye:

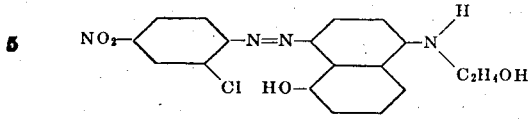

changes from its original blue color to a brownish shade. Cellulose acetate fabrics dyed with the indophenol dye having the formula:

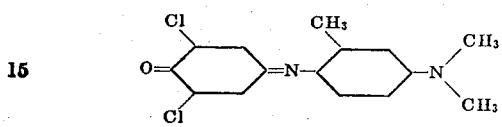

when exposed to nitrous acid and the combustion products of illuminating gas, for example, change from their original blue green color to a reddish pink. Similarly, cellulose acetate colored with the naphthazarin dye having the formula:

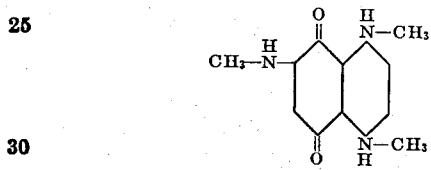

changes from blue to red, while cellulose acetate colored with the naphthazarin dye having the formula:

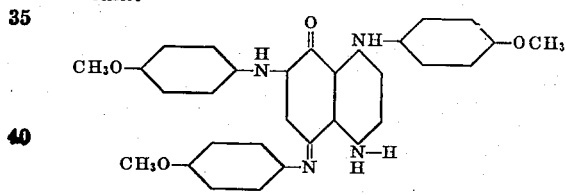

changes from a blue green to a pinkish red.

Various processes have been suggested for treating materials made of or containing an organic derivative of cellulose with chemical inhibiting agents to render colorations thereon more fast to acid fading but so far as we are aware none of these have proved commercially operative. However, the agents hitherto suggested have been commercially inoperative due, among other reasons, either to their toxicity, their causing skin irritation, their promotion of discoloration of the fabric on exposure to sunlight, their objectionable odor, their removal by dry cleaning solvents, their high cost or their general inoperativeness for the purpose suggested.

We have found that if a melamine compound such as melamine or a derivative thereof such as mono-acetyl melamine, mono-methyl melamine, tributyl melamine, mono-amyl melamine, monophenyl melamine and 2-acetyl-4-methyl melamine is incorporated into materials made of or containing an organic derivative of cellulose, the colorations of dyes having affinity for said materials but which are not fast to acid are rendered remarkably more fast to acid. Further, we have found that in many instances the incorporation of a melamine compound into said materials renders colorations produced therein more fast to light. By means of our invention, therefore, fading of colorations in materials made of or containing an organic derivative of cellulose, due to acid can be greatly mitigated or substantially obviated and in many instances some improvement in the fastness of the colorations to light is obtained.

In order that the expression "fastness to acid" or "fastness to acid fading" be clearly understood, it should be noted these expressions are used synonymously and have reference primarily to the fastness of colorations to combustion gases resulting from the burning of combustible products such as coal, oil, illuminating gas, natural gas, gasoline and coal gas, for example. It will be recognized that the combustion gases above mentioned are those commonly present in the atmosphere and particularly in the atmosphere of industrial towns or cities. These gases, therefore, are those to which colored cellulose acetate fabrics, for example, are commonly constantly exposed and, accordingly, for a practical solution of the problem of acid fading the colorations should be fast to such combustion gases.

It has been proposed to determine the fastness of colorations on materials made of or containing an organic derivative of cellulose by exposing the colored material to nitrous acid fumes. This test, however, while of value, has not been found to be entirely satisfactory since our experiments have shown that it does not always accurately determine or measure the fastness of a coloration to the conditions or agencies to which the coloration will normally be exposed. That is to say, a coloration may be sufficiently fast to nitrous acid fumes to be regarded as commercially practical yet not be sufficiently fast to the combustion gases present in the atmosphere to be commercially practical. In other instances, the reverse situation may hold and the coloration may be fast to said combustion gases but not fast to nitrous acid fumes. The incorporation of a melamine compound into cellulose ester or ether materials, for example, does increase the fastness of colorations produced therein with respect to nitrous acid fumes but for the reasons above given, the proposed nitrous acid tests are not to be taken as an infallible criterion as to whether colorations are or are not fast to acid. In practice we have found that exposure of the coloration to the combustion gases resulting from the burning of illuminating gas in a Bunsen burner provides a simple and more reliable test of the fastness of the coloration to acid than the proposed nitrous acid tests.

In accordance with our invention, the melamine compound may be incorporated in the material before, during or after dyeing. Advantageously, however, the melamine compound is added to the material after dyeing as it has been our experience that best results are obtained when this procedure is followed. The melamine compound may be incorporated in the material prior to dyeing by immersing the undyed material into an aqueous solution of the melamine compound and permitting the material to remain immersed until it has absorbed a suitable amount of the melamine compound. This treatment may be carried out, for example, while maintaining a temperature of 65–75° C. although higher or lower temperatures may be employed. A further method of incorporating the melamine compound in materials made of or containing an organic derivative of cellulose, and particularly materials made of or containing a cellulose acetate, consists in dissolving or otherwise incorporating the melamine compound in the spinning solution used in the manufacture of the materials. Thus, for example, a melamine compound may be dissolved in a cellulose acetate spinning solution and this solution may be spun according to dry spinning methods to produce cellulose acetate filaments which are capable of being directly dyed in shades fast to acid. These methods, wherein the melamine compound is applied to the material as just described or during the dyeing operation, as previously noted, have not been found to yield as satisfactory results as where the melamine compound is applied to the material to be treated after dyeing.

Advantageously, the melamine compound employed in the practice of our invention is melamine. This compound which is commonly represented by the formula:

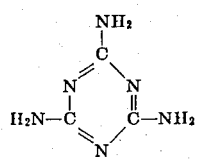

is a white solid having a melting point of about 370° C. In employing melamine in the practice of our invention, the material to be treated, such as a dyed cellulose acetate fabric, is immersed in an aqueous solution of melamine such as its water solution, and when the material has been sufficiently impregnated with melamine, it is removed from the solution and dried. Due to the relative insolubility of melamine in water, when a water solution of melamine is employed, the treating operation is, with advantage, conducted at a temperature of 60° C.–85° C., for example. The solubility of melamine in water is about one percent by weight at ordinary room temperature and approximately three percent by weight in water heated to boiling. It is for this reason that an elevated temperature is preferable when a water solution of melamine is the treating solution.

The present invention is free from the objections noted in connection with prior processes which have been suggested for treating materials to make colors thereon more resistant to acid or to the combined agencies of acid and light. Since melamine is non-toxic, odorless, highly insoluble in dry cleaning solvents, and causes no skin irritation, materials treated with it likewise are non-toxic, cause no skin irritation, and have no objectionable odor resulting from the presence of the melamine therein. Further, materials, such as dyed cellulose acetate fabrics, treated with melamine, may be subjected to dry cleaning without removal of the melamine because of its insolubility in dry cleaning solvents. Again, melamine does not promote a discoloration of the fabric, for example, on exposure to sunlight, and possesses the further advantages that it is highly effective for the purpose of rendering colorations on materials made of or containing an organic derivative of cellulose resistant to acid and in that it may be simply and economically applied to these materials.

It will be understood, of course, that since the melamine compound is the chemical inhibiting agent protecting the coloration of the material from acid or the combined agencies of acid and light, it must remain in the material after once being incorporated or impregnated therein. The relative insolubility of the melamine compounds, and melamine in particular, accordingly is of great value since, because of this feature, the melamine compound will remain in the material even though the material be subjected to various treatments such as, for example, dry cleaning.

In order that our invention may be fully understood, the preparation of certain melamine compounds is indicated herein. Melamine, for example, may be prepared as described in the chemical literature. One convenient method of preparing melamine, however, is to react dicyandiamide with liquid ammonia in a pressure vessel at temperatures of 100° C. and upwards. Monoacetylmelamine, which may be represented by the formula:

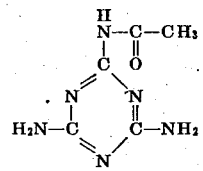

can be prepared by acetylation of melamine at an elevated temperature with acetic anhydride in a suitable pressure vessel. Monomethylmelamine, which may be represented by the formula:

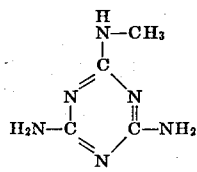

may be prepared by reacting one mole of cyanuric acid trichloride with one mole of methylamine dissolved in water at an elevated temperature in a pressure vessel and reacting the product thus obtained with at least two moles of liquid ammonia at an elevated temperature in a pressure vessel. Monoamylmelamine, which may be represented by the formula:

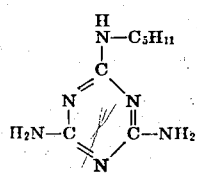

may be prepared according to the process indicated for monomethylmelamine by the substitution of one mole of amylamine for methylamine. Tributylmelamine, which may be represented by the formula:

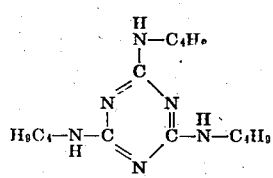

may be prepared by reacting one mole of cyanuric acid trichloride with at least three moles of butylamine at a temperature approximating 150° C., for example, in a pressure vessel. This reaction may be conducted in the presence of a solvent medium such as water. Monophenylmelamine, which may be represented by the formula:

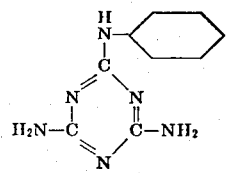

may be prepared by reacting one mole of cyanuric acid trichloride with one mole of aniline and then reacting the product thus obtained with at least 2 moles of liquid ammonia at an elevated temperature in a pressure vessel. 2-acetyl-4-methylmelamine, which may be represented by the formula:

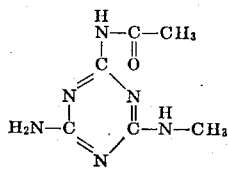

can be prepared by reacting monomethylmelamine with acetic anhydride in a closed vessel, for example.

The following examples illustrate the invention without, however, being in any way limitative.

*Example 1*

2 parts of 1,4-dimethylaminoanthraquinone are finely ground with a dispersing agent such as soap or oleyl glyceryl sulfate and the resulting paste is dispersed in 1000 parts of a 1% (by weight) solution of soap in water. The dispersion thus prepared is heated to a temperature approximating 45-55° C. and 100 parts of cellulose acetate silk in the form of yarn or fabric, for example, are added to the dyebath after which the temperature is gradually raised to 80-85° C. and the silk worked for several hours at this latter temperature. Sodium chloride may be added as desired during the dyeing operation to promote exhaustion of the dyebath. Upon completion of the dyeing operation, the cellulose acetate silk is removed, washed with a dilute solution of soap in water and rinsed with water. The color of the resulting cellulose acetate silk is blue.

The cellulose acetate yarn or fabric thus dyed may be added, while still wet, to 200 cc. of a 1% (by weight) solution of melamine in water. The temperature of the solution is then raised to 65° C. and the dyed cellulose acetate material is treated at this temperature for three-quarters of an hour. The cellulose acetate material is then removed and dried without first subjecting it to washing. The dyed cellulose acetate material was found to take up about 40 grams of the melamine solution and upon drying contains approximately .4 gram of melamine. Whereas the blue color of the untreated material is not fast to acid and changes in about 12-24 hours to a pinkish red color when exposed to the combustion products of a Bunsen burner burning illuminating gas, the blue coloration of the treated material is of good resistance to acid or the combined agencies of light and acid and undergoes no appreciable change in color when exposed to said combustion products for 100 hours.

*Example 2*

Two parts of 1-methylamino-4-ethylaminoanthraquinone are substituted for the dye compound of Example 1 and 100 parts of a cellulose acetate cloth are dyed in accordance with the method described in Example 1. The blue coloration obtained on the cellulose acetate cloth is not fast to acid but upon treatment with melamine, as described in Example 1, the coloration is rendered fast to acid.

1-methylamino-4-β-hydroxyethylaminoanthraquinone and 1-β-hydroxyethylamino-4-p-aminophenylaminoanthraquinone may be similarly substituted for the dye compound of Example 1 and applied to cellulose acetate fabrics in the manner described. If desired, however, these dyes or the other dyes disclosed herein may be applied to cellulose acetate fabrics or fabrics made of or containing another organic derivative of cellulose by other dispersion methods as is well known in the art. The respective blue and blue-green colorations obtained when these two latter dye compounds are employed are greatly enhanced with respect to fastness to acid by treatment with melamine in accordance with the method described in Example 1.

*Example 3*

100 grams of a cellulose acetate fabric dyed a blue green shade with an aqueous solution containing in suspension 1% (by weight) of an indophenol dye of the probable formula:

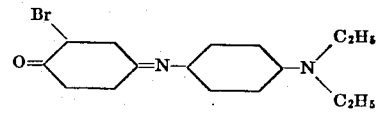

is added to 200 cc. of water containing 1% (by weight) of melamine and 0.06% (by weight) of sodium carbonate. The temperature of the mixture is then raised to 65° C. and the cellulose acetate fabric is treated for one hour at this temperature after which it is removed and dried without washing. The blue green coloration of the untreated material, which is not resistant to acid and changes in a relatively short time on exposure to combustion gases to a reddish pink color, is rendered much more fast to acid by the melamine treatment.

*Example 4*

100 grams of a cellulose acetate fabric is dyed with an indophenol dye having the probable formula:

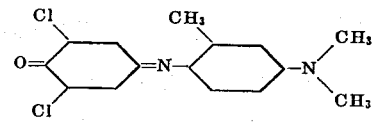

in accordance with Example 3 and is subjected to treatment with melamine in accordance with said example. The melamine treatment greatly increases the fastness of the blue green coloration yielded by this dye to acid.

*Example 5*

100 grams of a cellulose acetate fabric are dyed with a naphthazarin dye having the probable formula:

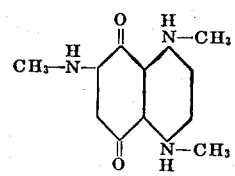

in accordance with Example 3 and subjected to treatment with melamine as described in said example. The treatment greatly improves the fastness of the coloration to acid.

*Example 6*

100 grams of a cellulose acetate fabric are dyed with a naphthazarin dye having the probable formula:

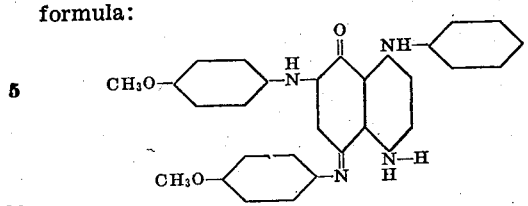

in accordance with Example 3 and subjected to treatment with melamine as described in said example. The treatment greatly improves the fastness of the coloration to acid.

While our invention has been illustrated in connection with the treatment of cellulose acetate materials, other cellulose ester or ether materials may likewise be treated in accordance with the present invention to improve the fastness of their colorations to acid. Similarly, while our invention has been described in connection with melamine, it will be clearly understood that other melamine compounds such as those referred to herein may be employed.

The melamine compounds employed in the practice of our invention may be applied to the material undergoing treatment in any suitable manner. Where a textile material in the form of cloth or fiber, for example, is undergoing treatment, the melamine compounds may be applied thereto from an aqueous solution, a water solution, for example, without the aid of solubilizing or dispersing agents. The melamine compound may be intimately admixed, for example, with solubilizing or dispersing agents such as sulfonated castor oil and sulfonated olive oil before addition to the treating bath and applied to the material to be treated with the aid thereof. Ordinarily, the use of a solubilizing or dispersing agent is unnecessary since the melamine compounds of our invention may be applied to the material from their water solutions. In the event, however, the melamine compound desired to be employed is highly insoluble in water, for example, the use of a solubilizing or dispersing agent may be found desirable.

The amount of the melamine compound incorporated in the material to be treated is, of course, subject to variation. In the case of melamine, for example, amounts approximating 0.4% (by weight) have been found very satisfactory where cellulose acetate materials were the materials treated. Smaller amounts of melamine, however, may be incorporated in the cellulose acetate materials and the benefits of our invention still be obtained although, if too small amounts of melamine are incorporated in the materials, the maximum benefits of the invention will not be obtained. Again, the amount of the melamine compounds to be in the material undergoing treatment is dependent upon the particular material which is to be treated and the extent of the improvement in the fastness of the coloration to acid desired. Further, the amounts of the melamine compounds incorporated in the material are dependent upon the dye or dyes employed for the coloration of the materials. The coloration of certain dyes, as will be appreciated, are more subject to acid fading than others and consequently in those cases a more extensive treatment in accordance with our invention is required to produce colorations of good resistance to acid. The amount of the treating agents necessary to be incorporated in the material in any given instance, however, can readily be determined by test.

While the improvement in the fastness of the coloration by treatment in accordance with our invention is subject to variation depending, for example, upon the material being treated and the dye employed for the coloration and, therefore, a statement with respect to improvement in the fastness of the colorations to acid generally applicable to all situations cannot be made. We have noted that in the case of anthraquinone dyes applied for the coloration of cellulose acetate materials, the color of the untreated material is appreciably changed in twelve to twenty-four hours, whereas these materials so colored, when treated with melamine do not fade or undergo any appreciable color change in one hundred hours. The times above stated refer, in each instance, to exposure of the material to the combustion gases from a Bunsen gas burner burning illuminating gas (i. e. the materials are subjected to the test more fully described hereinbefore). In many instances, the colorations of the treated materials remain substantially unchanged for periods greatly exceeding one hundred hours.

It should be further noted that deep shades of colors are ordinarily more resistant to acid fading than light shades and accordingly a less extensive treatment in accordance with our invention is required in the case of the deeper shades than in the case of the light shades.

We claim:
1. Process for the treatment of colored materials made of or containing an organic derivative of cellulose which comprises treating said materials with a water solution of melamine.
2. Process for the treatment of colored materials made of or containing a cellulose acetate which comprises treating said materials with a melamine compound.
3. Process for the treatment of colored textile materials made of or containing an organic derivative of cellulose for the purpose of increasing their fastness to acid which comprises treating said materials with a melamine compound.
4. Process for the treatment of colored textile materials made of or containing a cellulose acetate for the purpose of increasing their fastness to acid which comprises treating said materials with melamine.
5. Colored textile materials made of or containing an organic derivative of cellulose containing a melamine compound.
6. Colored textile materials made of or containing a cellulose acetate containing a melamine compound.
7. Colored textile materials made of or containing a cellulose acetate containing melamine.
8. Materials made of or containing an organic derivative of cellulose colored with an aminoanthraquinone dye and containing a melamine compound.
9. Colored materials made of or containing an organic derivative of cellulose having incorporated therein a melamine compound for the purpose of increasing the fastness of the colorations of said materials.
10. Process for improving the fastness of the coloration of a colored material made of or containing an organic derivative of cellulose which comprises incorporating a melamine compound in said colored material.
11. Process for improving the fastness of the coloration of a colored material made of or containing an organic derivative of cellulose which comprises incorporating melamine in said colored material.

12. Process for improving the fastness of the coloration of a colored material made of or containing a cellulose acetate which comprises incorporating melamine in said colored material.

13. Process for improving the fastness of the coloration of a colored material made of or containing a cellulose acetate colored with an aminoanthraquinone dye which comprises incorporating melamine in said colored material.

JAMES G. McNALLY.
JOSEPH B. DICKEY.